June 10, 1958  D. P. NELSON  2,837,745
SUPPORTING DEVICE
Filed Oct. 15, 1956
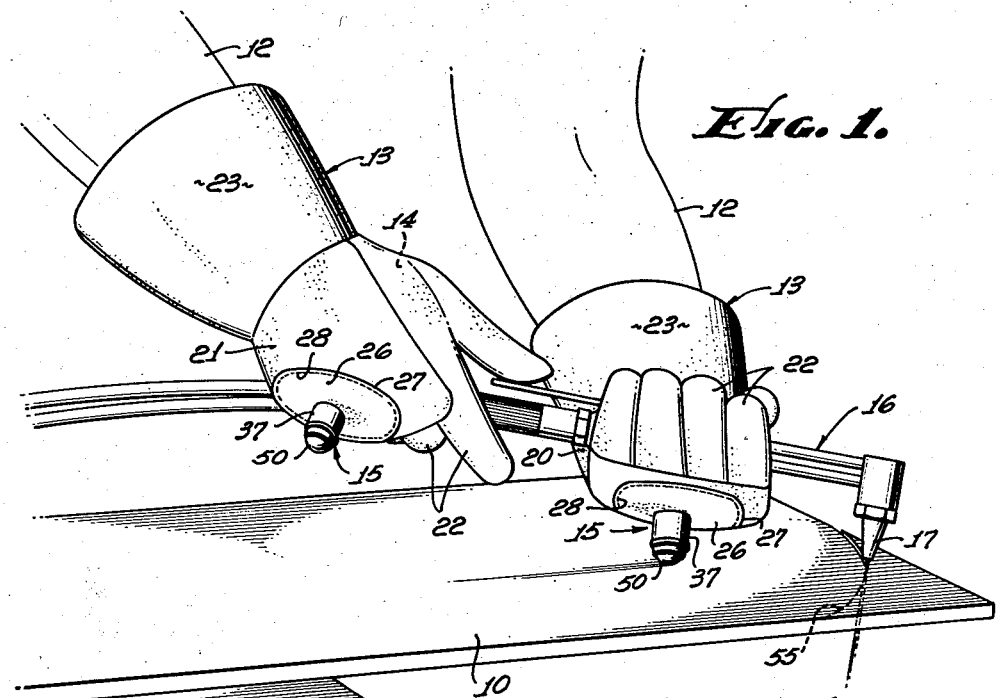
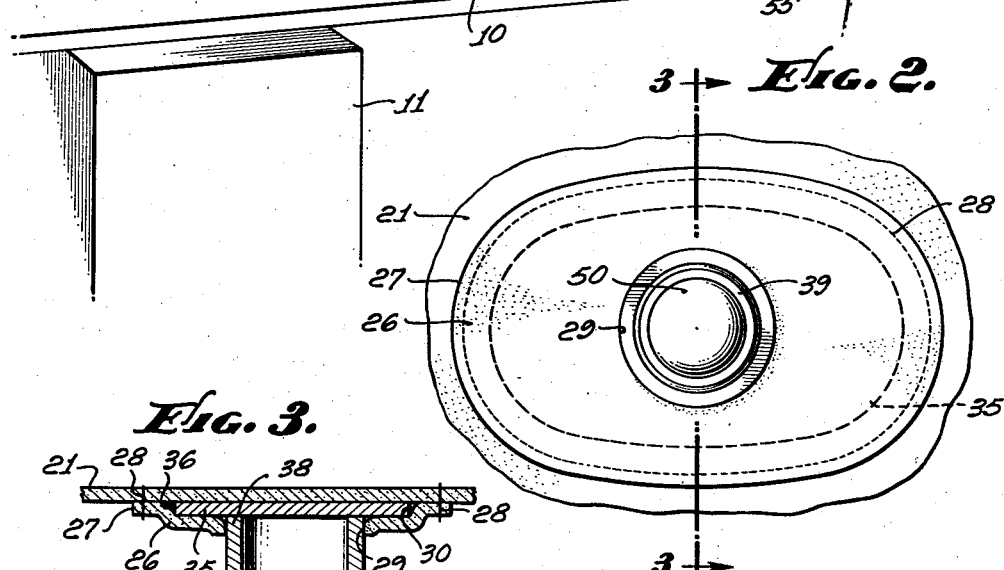
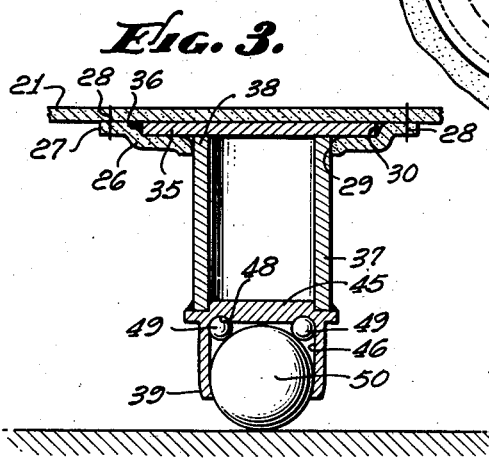
DAVID P. NELSON,
INVENTOR.
Huebner, Beehler, Worrel & Herzig.
BY
ATTORNEYS.

ly stated in the specification.

United States Patent Office 2,837,745
Patented June 10, 1958

2,837,745

SUPPORTING DEVICE

David P. Nelson, Porterville, Calif.

Application October 15, 1956, Serial No. 615,847

8 Claims. (Cl. 2—161)

The present invention relates to a supporting device and more particularly to a hand support adapted for attachment to the hand of a user and serving as a hand rest while holding and using a tool.

The subject invention was developed and is conveniently described in connection with welding and cutting operations. It will be evident as the description proceeds, however, that it is by no means limited to this environment in which it was initially developed. In welding, for example, a workman usually holds a welding torch or cutting torch in his gloved hands at a predetermined angle to the work with the torch tip pointed along the seam to be welded or line to be cut. It is then necessary to move the tip along the seam at a uniform and carefully controlled rate of speed. A torch motion is also frequently employed and this may be circular, zig-zag, or oval, as is desirable. Obviously to maintain the hands in a precise position such as this over extended periods of time causes fatigue. In addition, even with experienced workmen, it is difficult to hold the torch tip at the exact position desired without some slight shakiness thereby causing the tip to deviate from a desired seam line or cut line. This is usually aggravated by hand fatigue.

In an effort to steady the hands and to provide support therefor, many workmen rest their gloved hands on the work. The gloves are slid along the work to move the torch top along the seam. The extreme heat of the work makes it undesirable to bring the glove into contact with the work even though they may be made of heat resistant materials. Friction between the gloves and the work makes it difficult to move the torch with a uniform rate of speed and impairs free pivoting and rolling of the hands to guide the tip. If the torch is inadvertently held in one position too long, as happens when a workman rests momentarily or fails to move the torch at the correct speed, burning bubbles are formed and these result in an irregular or rough weld or cut, as the case may be.

Accordingly, it is an object of the present invention to provide a hand support.

Another object is to reduce hand fatigue while holding a tool in the hands and performing tasks therewith.

Another object is to provide a hand rest adapted for releasable attachment to a hand.

Another object is to provide a hand supporting attachment for a glove.

Another object is to enable greater control of the movements of a hand operated tool.

Another object is to enable a tool to be held steadily in the hands while performing work tasks with the tool.

Another object is to minimize shakiness and vibration of a hand operated tool while performing tasks with the tool.

Another object is to provide a glove attachment of the nature described which is especially useful as a hand rest during welding and cutting operations.

Other objects are to provide a hand support which is simple and economical to make and employ, durable in construction, and dependable in operation.

Further objects and advantages will become apparent in the subsequent description in the specification.

In the drawing:

Fig. 1 is a perspective view of a workpiece and illustrates the gloved hands of a workman holding a cutting torch in position for cutting the workpiece, and further, illustrates a hand support, as provided by the present invention, embodied in the gloves.

Fig. 2 is a somewhat enlarged fragmentary view of a portion of one of the gloves illustrated in Fig. 1 including the hand rest of the present invention.

Fig. 3 is a section taken on line 3—3 of Fig. 2.

Referring more particularly to the accompanying drawing, a workpiece 10, such as a sheet of metal, is rested on a support 11. The arms 12 of a workman are partially illustrated, and gloves 13 are fitted on the hands 14 of the workman. The gloves are provided with hand supporting attachments 15, constructed in accordance with the principles of the present invention. A cutting torch 16 having a tip 17 pointed toward the workpiece is held in the gloved hands of the worker. The torch is merely typical of many tools with which the present invention is advantageously employed. Each of the gloves is preferably made of asbestos material and includes a front portion 20, a back portion 21, fingers 22, and a cuff 23.

Each of the attachments 15 includes an annular collar 26 of generally oval shape and preferably made of asbestos or other heat resisting material. The collar has a peripheral edge 27 which is secured by stitches 28 to the back portion 21 of the glove 13. The collar provides a central circular opening 29. Together with the back portion of the glove, the collar defines a pocket 30, best seen in Fig. 3.

An oval mounting and stiffener plate 35 is fitted in the pocket 30 and provides a peripheral edge 36 adjacent to the edge 27 of the collar. Thus, it will be noted that the mounting plate is larger in area than the opening 29 so that the plate is held in the pocket. An elongated hollow shank 37 provides an inner end 38 secured, as by welding, to the mounting plate, and an outer end 39 outwardly extended from the plate in substantially perpendicular relation thereto. In this regard it is also to be noted that the shank extends outwardly from the back portion 21 of the glove 13.

A partition 45 is transversely mounted in the shank 37 in spaced relation to the end 39. The partition defines a ball-receiving socket 46 opening endwardly of the shank. The partition has an outwardly disposed surface in which is provided an annular race 48. Ball bearings 49 are located in the race. A spherical steel roller or ball 50 is fitted in the socket 46 against the bearings and is thus adapted for universal rotational movement. The outer end 39 of the shank is inturned in fitted relation to the ball for holding the latter in the socket and yet permitting the described rotational movement.

Operation

The operation of the described embodiment of the subject invention is believed to be readily apparent and is briefly summarized at this point. Assuming that it is desired to perform a cutting operation, the gloves 11 are equipped with the attachments 15, as above described, and the gloves fitted on the hands. The cutting torch 16 is then grasped in both hands in a well-known manner, such as shown in Fig. 1.

With the workpiece 10 supported on the bench 11, the ball 50 of the attachment 15 on the left gloved hand, for example, is rested on the workpiece. Holding the handle of the torch 16 in the right hand, the angle of the torch relative to the workpiece is adjusted, and the tip 17 is pointed toward a predetermined cutting line, indicated at 55.

The torch 16 is lit and flame is projected from the tip 17 against the workpiece 10. The tip is moved along the cutting line at the desired rate of speed during which time the ball 50 remains in contact with the workpiece. Movement of the torch is facilitated since the ball rotates in the socket 46 as it rolls over the workpiece. This minimizes the effect of friction between the workpiece and the ball in contrast to that which would occur if a sliding contact were provided. Whether sliding or rolling, however, the ball travels along the workpiece much easier than the glove 13 would if it were slid along the workpiece, as in the prior art practice. It is thus evident that the workman is able to maintain the speed of travel of the torch at a substantially uniform rate. The attachment 15 also provides a convenient rest for the hand. The position of the hands can be changed, without impairing movement of the torch, simply by rolling the left hand around on the ball 50 in completely universal action. The hand rest also supports the glove in spaced relation to the workpiece so as to avoid scorching or burning of the glove or the hands. In addition, the ball provides a convenient pivot about which the right hand can conveniently manipulate the tip 17 of the torch 16. This is particularly desirable when cutting along curved or irregular lines.

From the foregoing it will be evident that an attachment has been provided for a glove which reduces hand fatigue, enables substantially uniform movement of a tool while performing particular tasks, steadies the hands holding the tool, provides a convenient pivot for enabling greater control and manipulation of the tool, and which is otherwise highly effective for accomplishing its intended purpose.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. The combination of a glove having an external surface, a rollable support, and means mounted on the glove outwardly extended from its outer surface and universally journaling the rollable support on the glove in a position outwardly spaced from the external surface of the glove.

2. In combination with a glove, a stiffener mounted in the glove, an elongated shank rigidly mounted on the stiffener and having an outer end extended outwardly to a position in spaced relation from the glove, and a rollable support rollably mounted on the outwardly extended end of the shank.

3. A device for supporting the hand of a workman on a support surface and in spaced relation thereto while holding a tool in the hand of a workman whereby manipulation of the tool is facilitated comprising an elongated rigid support member having a mounting end and a support surface engaging end, and means secured to the mounting end of the member adapted to be fitted on a hand of a workman so that the member extends outwardly from such hand.

4. A device for supporting the hand of a workman on a support surface and in spaced relation thereto while holding a tool in the hand of the workman whereby manipulation of the tool is facilitated comprising an elongated rigid support member having a mounting end and a substantially spherical support surface engaging end, and hand receiving means adapted to be fitted on the hand of a workman having a portion adapted to overlay the back of the workman's hand, the mounting end of the support member being secured to said overlaying portion so that the support member extends outwardly from said overlaying portion and the workman's hand to provide a fulcrum for rested support of the hand.

5. In combination with a glove, an apparatus for steadying and movably supporting the glove on a resting surface comprising a stiffener mounted in the glove, a shank rigidly mounted on the stiffener and extended from the glove providing an end in spaced relation to the glove, and a spherical support roller mounted in the extended end of the shank for universal rotational movement therein and having a peripheral surface extended from the shank for engagement on a resting surface.

6. A device for resting the hand of a workman on a support surface and in spaced relation thereto while holding a tool in the hand of the workman whereby manipulation of the tool is facilitated comprising an elongated shank having a mounting end and an extended end providing a ball-receiving socket, a support surface engaging ball universally rotationally fitted in the socket, and a hand attaching member secured to the mounting end of the shank for supporting the shank on a hand of the workman in outward extension therefrom.

7. In combination with a hand receiving glove having a back portion adapted to overlay the back of the hand, a hand rest for supporting a hand in the glove in spaced relation to a support surface so that manipulation of a tool held in the hand is facilitated and hand fatigue is minimized comprising means secured to the back portion of the glove providing a pocket; a plate fitted in the pocket; a shank secured to the plate, outwardly extended therefrom, and having an endwardly disposed socket; and a support surface engaging ball universally rotationally fitted in the socket.

8. In combination with a welder's glove having a back portion and adapted to be fitted on the hand so that the back portion overlays the back of a hand; an attachment for the glove adapted to support the hand in spaced relation to a support surface while holding a tool during a work operation comprising an annular collar of flexible sheet material having a peripheral edge secured to the back portion of the glove, a central opening, and defining a pocket with the back portion of the glove; a plate larger than the opening in the collar fitted in the pocket; an elongated shank secured to the plate, outwardly extended from the glove through the opening in the collar, and having an extended open end; a transverse partition mounted in the shank in spaced relation to the open end thereof to define a ball-receiving socket opening endwardly of the shank; an annular row of substantially spherical bearings mounted in the partition and in the socket concentrically of the shank for individual universal rotational movement; and a ball of rigid material mounted in the socket against the bearings for universal rotational movement in the socket, the end of the shank being annularly inturned in fitted relation to the ball for retaining the ball in the socket but permitting rotational movement thereof.

References Cited in the file of this patent

UNITED STATES PATENTS

| | | |
|---|---|---|
| 1,309,150 | Monfort | July 8, 1919 |
| 2,686,316 | Linn | Aug. 15, 1954 |